United States Patent [19]
Lovelady et al.

[11] Patent Number: 6,154,034
[45] Date of Patent: Nov. 28, 2000

[54] METHOD AND APPARATUS FOR TESTING PHOTOVOLTAIC SOLAR CELLS USING MULTIPLE PULSED LIGHT SOURCES

[76] Inventors: James N. Lovelady, 22436 Abordo Dr., Saugus, Calif. 91350; Shawn A. Mitschelen, 36540 Peridot La., Palmdale, Calif. 93550

[21] Appl. No.: 09/175,849

[22] Filed: Oct. 20, 1998

[51] Int. Cl.$^7$ .................................................. G01R 31/00
[52] U.S. Cl. .......................... 324/501; 324/765; 136/290; 438/17
[58] Field of Search ............................ 136/290; 324/501, 324/765; 438/17

[56] References Cited

U.S. PATENT DOCUMENTS

| | | | |
|---|---|---|---|
| 4,129,823 | 12/1978 | van der Pool et al. | 324/20 R |
| 4,301,409 | 11/1981 | Miller et al. | 324/158 D |
| 4,581,578 | 4/1986 | Honma et al. | 324/158 D |

OTHER PUBLICATIONS

Fanetti, "Flash Technique For GaAs, Concentrator Solar Cell Measurement", Electronics Letters vol. 17, No. 13, p. 469–70, Jun. 25, 1981.

*Primary Examiner*—Mark Chapman
*Attorney, Agent, or Firm*—Terje Gudmestad; Michael W. Sales

[57] ABSTRACT

A method and apparatus for testing photovoltaic solar cells using multiple flashlamps is disclosed. The method comprises steps of providing a plurality of flashlamps, pulsing the flashlamps to expose the solar cell to light for a short period of time, preferably less than about 100 milliseconds, and measuring a characteristic of the photovoltaic solar cell in response to the radiation emitted by the flashlamps. In a preferred embodiment of the invention, for use in testing triple junction solar cells, the apparatus includes six flashlamps: one flashlamp tailored to emit light in a portion of the light spectrum for stimulating each of the three junctions, and three additional flashlamps for conducting specialized testing.

7 Claims, 1 Drawing Sheet

METHOD AND APPARATUS FOR TESTING PHOTOVOLTAIC SOLAR CELLS USING MULTIPLE PULSED LIGHT SOURCES

BACKGROUND OF THE INVENTION (a) Field of the Invention

The present invention relates generally to a method and apparatus for testing solar cells, and more particularly, to a method and apparatus for testing the responsiveness of solar cells to a precise spectral bandwidth of light.

(b) Description of Related Art

Multiple junction tandem solar cells comprise a plurality of (typically three) distinct layers of photovoltaic devices that are electrically connected in series to one another. Each layer uses a different portion of the solar spectrum, thereby taking advantage of the fact that devices sensitive to short wavelength light can be transparent to longer wavelengths.

When solar cells are manufactured, especially for space-based applications, testing of each cell is important in order to ensure adequate performance. Multiple junction solar cells are typically tested under a steady state solar simulator using relatively slow curve tracing and data acquisition equipment. The steady state solar simulator is a large, expensive device and at best has temporal instability ("flicker") in the range of a few percent. Adjusting the spectral filtering for multiple junction solar cells requires expensive additional equipment. Inserting special filters into the steady state solar simulator in order to obtain curves depicting current as a function of voltage (I-V curves) of individual junctions is a slow process.

For space-based applications, it is desirable to simulate sunlight that impinges an orbiting satellite, which is commonly known as Air Mass Zero sunlight, or AM0. Although the light source used for simulation of AM0 sunlight for electrical tests of solar cells need not be an exact match at all wavelengths (which would be extremely difficult), it must produce the same effect on each individual junction as would AM0 sunlight.

The slow testing method using the steady state solar simulator requires each solar cell to rest on a thermally controlled block to maintain an even temperature during testing. The current testing cycle is typically thirty seconds or more per cell.

More recently, pulse simulators have been developed. One exemplary pulse simulator that is commercially available is the Large Area Pulsed Solar Simulator II, available from Spectrolab, Inc. 12500 Gladstone Avenue, Slymar, Calif. 91342, a division of Hughes Electronics Company, the assignee of the present invention. Pulse simulators use a pulse of light from a flashlamp, such as a Xenon flashlamp, rather than a steady-state source of light, in order to test solar cells. Most photovoltaic devices, particularly for aerospace use, are relatively fast devices, with time constants on the order of tens of microseconds or less. This makes the use of a short light pulse for testing solar cells an attractive solution for a number of reasons. Thermal control of the device being tested is simplified, as the pulsing of the lamp does not result in a significant increase in the temperature of the solar cells. Also, exposure of workers to harmful ultraviolet light is minimized, and the optics design to obtain uniform light at a target plane is simple and inexpensive. However, pulse simulators that use a single flashlamp still require careful tailoring of the spectrum of light emitted by the flashlamp in order to simulate sunlight.

Accordingly, there is a need for a method and system for testing solar cells that is configured so as to minimize or eliminate the aforementioned problems.

SUMMARY OF THE INVENTION

In accordance with one aspect of the present invention, a method of testing a photovoltaic solar cell is provided. The method comprises the steps of providing a plurality of light sources, pulsing the light sources to expose the solar cell to light (preferably for less than about 100 milliseconds, and normally from about 1 to about 10 milliseconds), and measuring a characteristic of the photovoltaic solar cell in response to the light. Preferably, the method includes a further step of measuring voltage produced by the photovoltaic solar cell.

In accordance with another aspect of the present invention, an apparatus for testing a photovoltaic solar cell comprises: a plurality of light sources; an electronic control module for pulsing the light sources to expose the solar cell to light; and an electronic data acquisition system for measuring a characteristic of the photovoltaic solar cell in response to the light.

The invention itself, together with further objects and attendant advantages, will be best understood by reference to the following detailed description, taken in conjunction with the accompanying drawings.

DESCRIPTION OF THE PREFERRED EMBODIMENT

Figure 1:
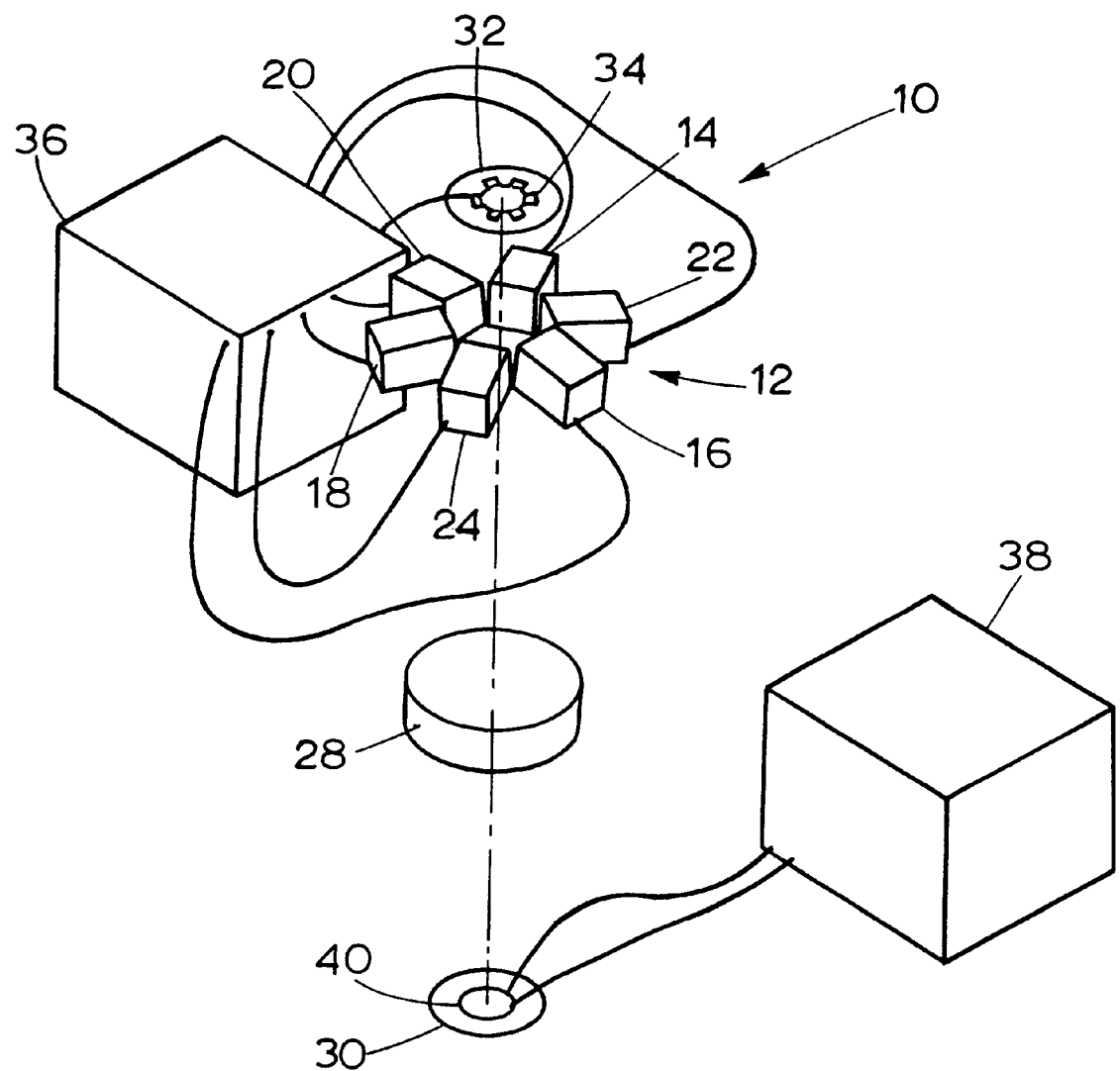
FIG. 1 is a schematic view of a system in accordance with the present invention.

In accordance with one aspect of the present invention, a method and system for testing a solar cell uses multiple flashlamps. Ideally, a separate flashlamp is provided for each junction of the solar cell, so that the spectrum of each flashlamp can be tailored to the spectrum in which the corresponding junction is designed to operate.

FIG. 1 shows schematically a solar cell testing system 10 in accordance with the present invention. The testing system 10 includes a flashlamp array 12 comprising six flashlamps 14, 16, 18, 20, 22, and 24. A beam splitter 28 is disposed below the flashlamp array 12 and projects light onto an eight inch (20.3 cm) diameter test plane 30, and onto a reflected image 32 of the test plane 30. The reflected image 32 of the test plane 30 is analyzed by irradiance monitors 34 that are connected to an electronic control module 36 that controls the flashlamps 14, 16, 18, 20, 22, and 24, and an electronic I-V curve data acquisition system 38 analyzes the performance of each solar cell 40 being tested in the solar cell testing system 10. The flashlamp 14 is a short wavelength flashlamp, the flashlamp 16 is a medium wavelength flashlamp, and the flashlamp 18 is a long wavelength flashlamp.

Flashlamps 20, 22 and 24 are filtered to emit light in a portion of the spectrum for stimulating a corresponding junction of the solar cell 40. The size of flashlamps 14, 16, 18, 20, 22, and 24 is relatively small, and lamp current can be actively controlled during each light pulse to optimize the light emitted by each of flashlamps 14, 16, 18, 20, 22 and 24.

The light level emitted by each of flashlamps 14, 16, 18, 20, 22 and 24 can be adjusted over a wide range, and the light level can be accurately held during the working portion of the light pulse by monitoring the light pulse with an irradiance monitor 34 that is sensitive to only that portion of the spectrum of light emitted by the flashlamps 14, 16, 18, 20, 22 or 24. By balancing the currents in flashlamps 14, 16, 18, 20, 22 and 24, each junction of the solar cell 40 being tested can be stimulated to the same level as it would be under AM0 light. Automatic monitoring is performed by the electronic control module 36, thereby making it unnecessary to separately measure steady-state irradiance level or color balance except during infrequent calibration checks.

The solar cell testing system 10 can be configured to perform specialized tests, for example, in order to measure the I-V characteristics of one of the junctions individually. This may be achieved by overstimulating the other junctions so that the current measured is determined solely by the desired junction. Another useful specialized test for triple junction solar cells (also valuable for single-junction solar cells) involves measuring the I-V curve at a reduced light level, so that series resistance of the solar cell 40 may be readily calculated. Such specialized tests can be performed by using three of the flashlamps 14, 16, 18, 20, 22 and 24, and simply altering the currents supplied to each flashlamp being used. An alternate method is to provide a separate flashlamp with a spectral filter tailored to the specific junction to be tested. In a high-volume production application, the use of separate flashlamps to test each junction for such specialized testing has the advantage of allowing the main set of flashlamps to cool down during the specialized tests, thereby decreasing the overall cycle time for testing.

For most applications, each of the flashlamps 14, 16, 18, 20, 22 and 24 can be a small Xenon flashlamp, such as a standard Xenon flashlamp having a 2 millimeter bore size and a 3 inch (7.62 cm) arc length, which can be expected to have a lamp life on the order of millions of flashes, resulting in minimal maintenance. Because only a narrow spectral band is used for each of the flashlamps 14, 16, 18, 20, 22 and 24, it is not necessary to match the spectral output of sunlight, and a lower, more economical power level can be used than when a single flashlamp is used. In cases where the characteristic line spectrum from a Xenon lamp falls close to a critical wavelength for the solar cells being tested, Argon or Krypton flashlamps may be used to shift this line emission to a less critical position.

The complete I-V curve for each solar cell 40 can be obtained easily during the light pulse using the electronic I-V curve data acquisition system 38 to process the measured data and to quickly perform a wide variety of pass/fail tests on the measured I-V curve. The flashlamps 14, 16, 18, 20, 22 and 24 may be flashed as often as every 0.6 seconds, and with careful design of the electronic control module 36 and the electronic I-V curve data acquisition system 38, it should be possible to perform a complete series of tests and data analysis in two seconds or less.

By careful choice of filter bandwidths, accurate measurements can be assured over the normal range of lamp manufacturing variations. Each of the flashlamps 14, 16, 18, 20, 22, and 24 may be monitored throughout the pulse by one of the irradiance monitors 34 that is sensitive to only the appropriate spectral region for that flashlamp.

While the present invention has been described with reference to specific examples, which are intended to be illustrative only, and not to be limiting of the invention, it will be apparent to those of ordinary skill in the art that changes, additions and/or deletions may be made to the disclosed embodiments without departing from the spirit and scope of the invention. For example, although the present invention is well suited for use in testing triple junction solar cells, it is also just as applicable for use in testing other types of solar cells, such as single and dual junction devices.

Also, the layout shown in FIG. 1 is meant to be exemplary only, as other arrangements are possible without departing from the spirit and scope of the invention. For example, folding mirrors could be used to make the system more compact if desired.

What is claimed is:

1. A method of testing a photovoltaic solar cell, the method comprising the steps of:

providing a plurality of flashlamps;

pulsing the flashlamps to expose the solar cell to light for a period of time less than about 100 milliseconds; and measuring a characteristic of the photovoltaic solar cell in response to the light.

2. The method of claim 1, wherein the step of measuring a characteristic comprises a step of measuring electrical current.

3. The method of claim 1, further comprising an additional step of measuring voltage produced by the photovoltaic solar cell.

4. The method of claim 1, wherein the light sources are pulsed for a period of time less than about 10 milliseconds.

5. An apparatus for testing a photovoltaic solar cell, comprising:

a plurality of flashlamps, each flashlamp capable of being pulsed for a period of time less than about 100 milliseconds;

an electronic control module for pulsing the flashlamps to expose the solar cell to light; and an electronic data acquisition system for measuring a characteristic of the photovoltaic solar cell in response to the light.

6. The apparatus of claim 5, wherein the electronic data acquisition system comprises means for measuring voltage produced by the photovoltaic solar cell.

7. The apparatus of claim 5, wherein the light sources are capable of being pulsed for less than about 10 milliseconds.

* * * * *